(12) United States Patent
Lee et al.

(10) Patent No.: US 11,978,901 B2
(45) Date of Patent: May 7, 2024

(54) CATHODE FOR LITHIUM SECONDARY BATTERY AND LITHIUM SECONDARY BATTERY INCLUDING THE SAME

(71) Applicant: SK ON CO., LTD., Seoul (KR)

(72) Inventors: Yong Seok Lee, Daejeon (KR); Jae Ram Kim, Daejeon (KR); Ji Won Na, Daejeon (KR); Sang Won Bae, Daejeon (KR); Yeon Hwa Song, Daejeon (KR); Ki Joo Eom, Daejeon (KR); Myung Ro Lee, Daejeon (KR); Jae Yeong Lee, Daejeon (KR); Hyun Joong Jang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/338,277

(22) Filed: Jun. 20, 2023

(65) Prior Publication Data
US 2024/0006606 A1    Jan. 4, 2024

(30) Foreign Application Priority Data

Jun. 30, 2022 (KR) .................. 10-2022-0080605

(51) Int. Cl.
| | | |
|---|---|---|
| *H01M 4/525* | (2010.01) | |
| *H01M 4/133* | (2010.01) | |
| *H01M 4/505* | (2010.01) | |
| *H01M 10/0525* | (2010.01) | |
| *H01M 4/02* | (2006.01) | |

(52) U.S. Cl.
CPC .......... *H01M 4/525* (2013.01); *H01M 4/133* (2013.01); *H01M 4/505* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | |
|---|---|---|
| 11,233,239 B2 | 1/2022 | Manthiram et al. |
| 2019/0190063 A1* | 6/2019 | Gogyo ............... H01M 4/622 |
| 2022/0340446 A1* | 10/2022 | Qiao .................. H01M 4/62 |

FOREIGN PATENT DOCUMENTS

| | | |
|---|---|---|
| CN | 108630941 A | 10/2018 |
| CN | 111916723 A | 11/2020 |
| KR | 10-2004-0073076 A | 8/2004 |

(Continued)

OTHER PUBLICATIONS

Office Action for the Korean Patent Application No. 10-2022-0080605 issued by the Korean Intellectual Property Office on Dec. 6, 2023.

(Continued)

*Primary Examiner* — Carlos Barcena
(74) *Attorney, Agent, or Firm* — IP & T GROUP LLP

(57) ABSTRACT

A cathode for a lithium secondary battery includes a cathode current collector, and a cathode active material layer formed on the cathode current collector. The cathode active material layer includes a cathode active material and a conductive material ID/IG is in a range from 0.5 to 1.25 in a Raman spectrum of the cathode active material layer. The cathode active material includes lithium metal oxide particles containing nickel and manganese and having a content of cobalt of less than 2 mol % among all elements except for lithium and oxygen.

12 Claims, 3 Drawing Sheets

100

(56) References Cited

FOREIGN PATENT DOCUMENTS

| KR | 10-2013-0139711 A | 12/2013 |
| KR | 10-2016-0055138 A | 5/2016 |
| KR | 10-2016-0146580 A | 12/2016 |
| KR | 10-2017-0069153 A | 6/2017 |
| KR | 20170111746 A | 10/2017 |
| KR | 10-2018-0059736 A | 6/2018 |
| KR | 10-2020-0085679 A | 7/2020 |
| KR | 10-2178780 B1 | 11/2020 |
| KR | 10-2021-0134659 A | 11/2021 |

OTHER PUBLICATIONS

Extended European Search Report for the European Patent Application No. 23182324.6 issued by the European Patent Office on Nov. 23, 2023.

Raoof Bardestani et al., Experimental methods in chemical engineering: specific surface area and pore size distribution measurements—BET, BJH and DFT, Canadian Journal of Chemical Engineering, Wiley Subscription Services, Inc., A Wiley Company, 2019, pp. 2781-2791, vol. 97, No. 11. Available at URL: https://onlinelibrary.wiley.com/doi/epdf/10.1002/cjce.23632.

G.E. Amidon et al., Tapped Density, Developing Solid Oral Dosage Forms (Second Edition) Pharmaceutical Theory and Practice, 2017, pp. 271-293. Available at URL: https://doi.org/10.1016/B978-0-444-53242-8.00008-4.

Masaki Yoshio et al., Preparation of $LiyMnxNi1-xO2$ as a cathode for lithium-ion batteries, Journal of Power Sources, Jul. 15, 1998, pp. 46-53, vol. 74, No. 1. Available at DOI:10.1016/S0378-7753(98)00011-1.

* cited by examiner

CATHODE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2022-0080605 filed on Jun. 30, 2022 in the Korean Intellectual Property Office (KIPO), the entire disclosure of which is incorporated by reference herein.

BACKGROUND

1. Field

The present disclosure relates to a cathode for a lithium secondary battery and a lithium secondary battery including the same. More particularly, the present invention relates to a cathode for a lithium secondary battery including lithium-nickel-based metal oxide particles and a lithium secondary battery including the same

2. Description of the Related Art

A secondary battery which can be charged and discharged repeatedly has been widely employed as a power source of a mobile electronic device such as a mobile phone, a laptop computer, etc. A lithium secondary battery is actively developed and employed due to high operational voltage and energy density per unit weight, a high charging rate, a compact dimension, etc.

For example, the lithium secondary battery may include an electrode assembly including a cathode, an anode and a separation layer interposed between the cathode and the anode, and an electrolyte solution immersing the electrode assembly.

For example, the cathode may include a cathode current collector and a cathode active material layer formed on the cathode current collector. The cathode active material layer may include a lithium metal oxide as a cathode active material.

For example, lithium cobalt oxide ($LiCoO_2$), lithium nickel oxide ($LiNiO_2$), lithium manganese oxide ($LiMnO_2$, $LiMn_2O_4$, etc.), a lithium iron phosphate compound ($LiFePO_4$), an NCM-based lithium metal oxide containing nickel, cobalt and manganese, an NCA-based lithium metal oxide containing nickel, cobalt and aluminum, etc., may be used as the cathode active material.

A price of cobalt is relatively high compared to other metals such as nickel and manganese. Thus, it is disadvantageous from an aspect of a production cost to use a large amount of lithium metal oxide particles containing a high concentration of cobalt as a power source for a large-scaled device such as an electric vehicle.

Accordingly, research for developing a lithium metal oxide that does not contain cobalt are in progress. However, when the lithium metal oxide particles do not contain cobalt, life-span properties and resistance properties may be deteriorated.

SUMMARY

According to an aspect of the present disclosures, there is provided a cathode for a lithium secondary battery having improved resistance and life-span properties.

According to an aspect of the present disclosures, there is provided a lithium secondary battery having improved resistance and life-span properties.

A cathode for a lithium secondary battery includes a cathode current collector, and a cathode active material layer formed on the cathode current collector. The cathode active material layer includes a cathode active material and a conductive material, and satisfies Formula 1. The cathode active material includes lithium metal oxide particles containing nickel and manganese and having a content of cobalt of less than 2 mol % among all elements except for lithium and oxygen:

$$0.5 \leq I_D/I_G \leq 1.25 \qquad \text{Formula 1}$$

In Formula 1, $I_D$ is a maximum peak intensity in a range of 1,300 $cm^{-1}$ to 1,400 $cm^{-1}$ in a Raman spectrum of the cathode active material layer, and $I_G$ is a maximum peak intensity in a range of 1,550 $cm^{-1}$ to 1,650 $cm^{-1}$ in the Raman spectrum of the cathode active material layer.

In some embodiments, the lithium metal oxide particles may not contain cobalt.

In some embodiments, a content of nickel in the lithium metal oxide particles is in a range from 70 mol % to 85 mol % among all elements except lithium and oxygen.

In some embodiments, the lithium metal oxide particles may have a single particle shape.

In some embodiments, the lithium metal oxide particles may have an average particle diameter ($D_{50}$) from 2 μm to 7 μm.

In some embodiments, the lithium metal oxide particles may have a specific surface area from 0.6 $μm^2/g$ to 0.85 $μm^2/g$.

In some embodiments, the lithium metal oxide particles may have a tap density from 2 $g/cm^3$ to 2.3 $g/cm^3$.

In some embodiments, the conductive material may include a linear-type conductive material.

In some embodiments, the conductive material may further include a dot-type conductive material.

In some embodiments, the linear-type conductive material may include carbon nanotube, and the dot-type conductive material may include at least one selected from the group consisting of graphite, carbon black, graphene, tin, tin oxide, titanium oxide, $LaSrCoO_3$ and $LaSrMnO_3$.

In some embodiments, a length of the linear-type conductive material may be in a range from 10 μm to 55 μm.

In some embodiments, the dot-type conductive material may have an average particle diameter ($D_{50}$) from 20 nm to 50 nm.

A lithium secondary battery may include a cathode according to the above-described embodiments, and any suitable anode.

In some embodiments, a cathode may comprise a lithium metal oxide containing nickel and manganese and a low content of cobalt may be used as a cathode active material. Further, an $I_D/I_G$ value of a cathode for a lithium secondary battery according to Raman spectroscopic analysis may be adjusted within a predetermined range.

Accordingly, the cathode for a lithium secondary battery having improved resistance and life-span properties may be achieved while reducing the content of cobalt.

DETAILED DESCRIPTION OF THE EMBODIMENTS

Hereinafter, embodiments disclosed by the present application will be described in detail. However, the embodiments are provided as illustrative examples, and the present invention is not limited to the specific embodiments.

Figure 1:
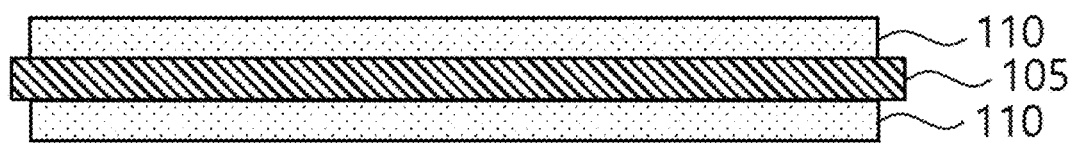
FIG. 1 is a schematic cross-sectional view of a cathode for a lithium secondary battery in accordance with some embodiments.

FIG. 1 is a schematic cross-sectional view of a cathode for a lithium secondary battery in accordance with some embodiments.

Referring to FIG. 1, a cathode for a lithium secondary battery 100 includes a cathode current collector 105 and a cathode active material layer 110 formed on the cathode current collector 105.

For example, the cathode active material layer 110 may be formed on one surface or both surfaces of the cathode current collector 105.

The cathode active material layer 110 may include a lithium metal oxide particle as a cathode active material and a conductive material. The cathode active material layer 110 may further include a binder.

According to embodiments according to the disclosure of the present application, the lithium metal oxide particle may contain nickel (Ni) and manganese (Mn). A content of cobalt (Co) in the lithium metal oxide particle may be less than 2 mol % based on all elements except lithium and oxygen.

In some embodiments, the content of Co in the lithium metal oxide particle may be 1.5 mol % or less. In some embodiments, the content of Co in the lithium metal oxide particle may be 1 mol % or less, or 0.5 mol % or less.

In some embodiments, the lithium metal oxide particle may substantially contain no Co at all.

In some embodiments, a content of nickel in the lithium metal oxide may be in a range from 60 mol % to 90 mol % of all elements except lithium and oxygen. In some embodiments, the content of nickel in the lithium metal oxide may be in a range from 65 mol % to 85 mol %, or from 70 mol % to 85 mol %.

In some embodiments, the lithium metal oxide particle may include a chemical structure or crystal structure represented by Chemical Formula 1 below.

$$Li_aNi_xCo_yMn_{1-x-y}O_2 \qquad \text{Chemical Formula 1}$$

In Chemical Formula 1, $0.9 \leq a \leq 1.2$, $0.6 \leq x \leq 0.9$ and $0 \leq y \leq 0.02$.

In some embodiments, $0.9 \leq a \leq 1.1$.
In some embodiments, $y \leq 0.01$, or $y \leq 0.005$.
In some embodiments, $y > 0$, or $y > 0.001$.
In some embodiments, $y = 0$.
In some embodiments, $0.65 \leq x \leq 0.85$ or $0.7 \leq x \leq 0.85$.

The cathode active material may include a plurality of the lithium metal oxide particles. For example, an amount of the lithium metal oxide particles based on a total weight of the cathode active material may be 50 weight percent (wt %) or more. In an embodiment, the amount of the lithium metal oxide particles based on the total weight of the cathode active material may be 60 wt % or more, 70 wt % or more, 80 wt % or more, 90 wt % or more, or 95 wt % or more.

In some embodiments, the cathode active material may substantially consist of the lithium-transition metal oxide particles.

The lithium metal oxide particles may contain cobalt in a small amount (more than 0 mol % and less than 2 mol %) or may have no cobalt, so a production cost can be reduced. However, as the content of cobalt decreases, resistance and life-span properties of the lithium secondary battery employing the lithium metal oxide particles may be relatively degraded.

However, the cathode active material layer 110 according to embodiments of the present disclosures may satisfy Formula 1 below. Accordingly, resistance and power characteristics of the lithium secondary battery may be improved even when lithium metal oxide particles with very little cobalt or no cobalt are used.

$$0.5 \leq I_D/I_G \leq 1.25 \qquad \text{Formula 1}$$

In Formula 1, $I_D$ is a maximum peak intensity in a range from 1,300 cm$^{-1}$ to 1,400 cm$^{-1}$ in a Raman spectrum of the cathode active material layer, and $I_G$ is a maximum peak intensity in a range from 1,550 cm$^{-1}$ to 1,650 cm$^{-1}$ in the Raman spectrum of the cathode active material layer.

If $I_D/I_G$ exceeds 1.25, an electrical conductivity may not be sufficiently improved, and the resistance and power properties of the lithium secondary battery may be relatively deteriorated.

If $I_D/I_G$ is less than 0.5, a crystallinity of the conductive material may be excessively increased. Accordingly, cracks in the cathode active material layer 110 may be excessively caused by a volume change of the lithium metal oxide particles during a pressing process in a fabrication of the cathode or during charging and discharging. Accordingly, deterioration of the cathode 100 may be accelerated, and the life-span properties of the lithium secondary battery may be degraded.

In some embodiments, $I_D/I_G$ may be in a range from 0.75 and 1.25. In some embodiments, $I_D/I_G$ may be in a range from 0.85 to 1.25, or from 1 to 1.2.

In some embodiments, the desirable $I_D/I_G$ value may be obtained by selecting the conductive material or adjusting physical properties of the conductive material to be used together with the lithium metal oxide in the cathode active material layer 110. In some embodiments, different types of the conductive materials may be blended and used, and the $I_D/I_G$ value may be controlled by mixing ratios of each conductive material included in the blend.

In some embodiments, the conductive material may include a linear-type conductive material. The linear-type conductive material may also be referred to as an elongated conductive material or a needle-shape conductive material. For example, the linear-type conductive material may include a fibrous conductive material.

In some embodiments, an aspect ratio (length/diameter) of the linear-type conductive material may be in a range from 2 to 10,000, from 10 to 5,000, from 50 to 3,000, or from 100 to 1,000.

In some embodiments, the linear-type conductive material may include a carbon nanotube (CNT). The linear-type conductive material may include a single-walled CNT (SWCNT), a double-walled CNT (DWCNT), a multi-walled CNT (MWCNT), or a bundled carbon nanotube (rope CNT), etc.

In some embodiments, the length of the linear-type conductive material may be in a range from 10 μm to 55 μm. Within the above range, a reduction of an energy density of the cathode 100 may be prevented while improving the resistance and life-span properties of the cathode 100.

In some embodiments, the conductive material may further include a dot-type conductive material (may also be referred to as a spherical-shape conductive material). In this case, the $I_D/I_G$ value may be easily adjusted within the above-described range. Additionally, the linear-type conductive material may form a conductive network throughout an entire area of the cathode active material layer 110, and the dot-type conductive material may additionally form a conductive network in a local area, thereby improving the electrical conductivity and the resistance properties of the cathode 100.

When the dot-type conductive material is used in combination with the lithium metal oxide particle having a cobalt content of 2 mol % or more, improvement of the resistance properties of the lithium secondary battery may be insufficient, and rapid charging properties of the lithium secondary battery may be rather degraded.

In some embodiments, an aspect ratio (length/diameter) of the dot-type conductive material may be in a range from 0.5 to 1.5. In some embodiments, a sphericity of the dot-type conductive material may be in a range from 0.7 to 1, from 0.8 to 1, or from 0.9 to 1.

In some embodiments, an average particle diameter ($D_{50}$) of the dot-type conductive material may be in a range from 10 nm to 100 nm, from 10 nm to 75 nm, or from 20 nm to 50 nm. Within the above range, the resistance and the life-span properties of the lithium secondary battery may be further improved. The average particle diameter ($D_{50}$) may be defined as a particle diameter at 50% in a volume cumulative particle diameter distribution, and may be measured using a laser diffraction method (microtrac MT 3000).

In some embodiments, a specific surface area (a BET specific surface area) of the dot-type conductive material may be in a range from 50 $\mu m^2/g$ to 500 $\mu m^2/g$, from 100 $m^2/g$ to 350 $\mu m^2/g$, or from 150 $\mu m^2/g$ to 300 $m^2/g$.

For example, the dot-type conductive material may include a carbon-based conductive material such as graphite, carbon black, graphene and carbon nanotube; or a metal-based conductive material such as tin, tin oxide, titanium oxide, $LaSrCoO_3$, $LaSrMnO_3$, etc.

In some embodiments, a weight ratio of the dot-type conductive material to the linear-type conductive material in a total weight of the cathode active material layer 110 may be in a range from 1/9 to 9, from 1/4 to 4, or from 3/7 to 7/3.

In some embodiments, the lithium metal oxide particle may have a single particle shape.

The single particle may be morphologically distinguished from a secondary particle formed by aggregation of primary particles. For example, the single particle and the secondary particle may be classified based on a cross-sectional image of a particle measured by a scanning electron microscope (SEM).

For example, the secondary particle may refer to a particle that is substantially considered or observed as one particle by aggregation of a plurality of the primary particles. For example, boundaries of the primary particles may be observed in the SEM cross-sectional image of the secondary particle. For example, the primary particle may have an average particle diameter ($D_{50}$) or a minor axis length of less than 1 μm, 900 nm or less, or from 100 nm to 900 nm.

In some embodiments, the secondary particles may be defined by aggregation of more than 10, 30 or more, 50 or more, or 100 or more of the primary particles.

For example, the single particle may refer to a monolith structure rather than an aggregate. For example, boundaries of the primary particles may not be observed in the SEM cross-sectional image of the single particle.

In some embodiments, micro-particles (e.g., particles having a volume of 1/100 or less of a volume of the single particle) may be attached to the surface of the single particle, and this shape is not excluded from the concept of the single particle.

Figure 4:
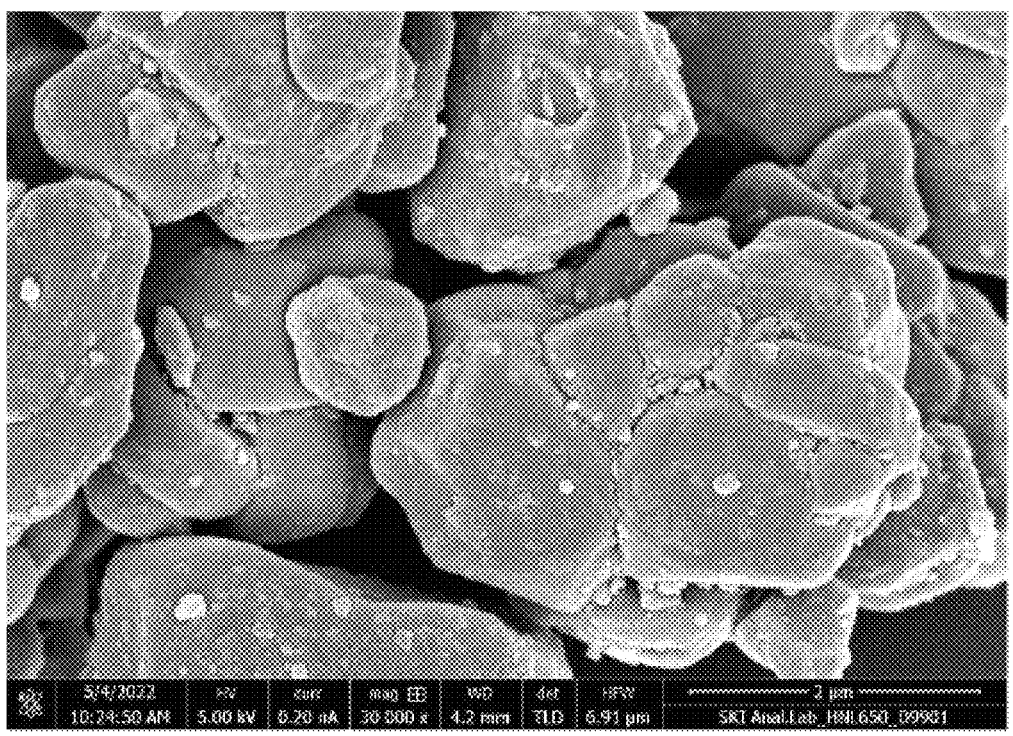
FIG. 4 is a scanning electron microscope (SEM) image of lithium metal oxide particles of Example 1.
Figure 5:
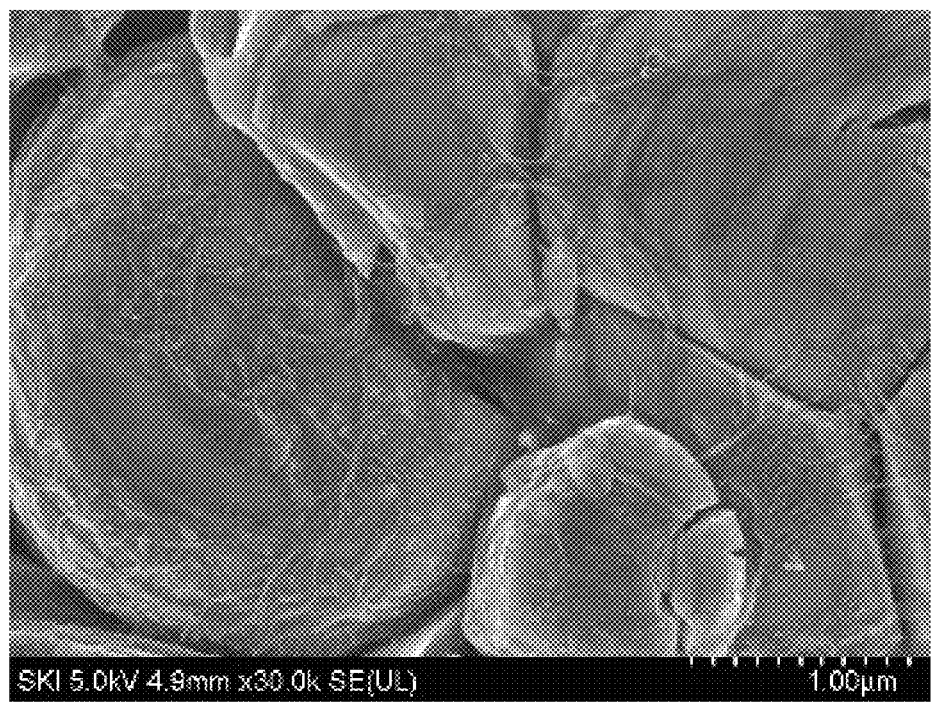
FIG. 5 is a SEM image of multi-walled carbon nanotubes (MWCNTs) of Example 1.
Figure 6:
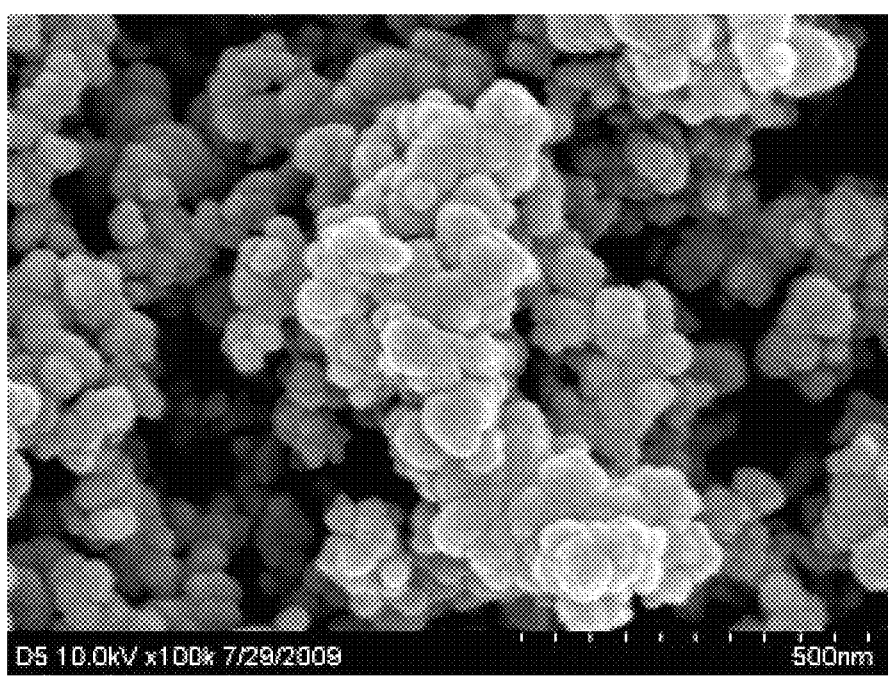
FIG. 6 is a SEM image of carbon black of Example 7.

For example, the single particles may be present in contact with each other. For example, 2 to 10, 2 to 5, or 2 to 3 single particles may be present in contact with each other (as shown in FIG. 4).

The lithium metal oxide particle having the single particle shape may provide improved life-span properties of the lithium secondary battery, but resistance and power properties may be relatively lowered. However, according to embodiments of the present disclosures, the cathode active material layer 110 may be formed to have the $I_D/I_G$ value in the above-described range, and the resistance and power properties of the lithium secondary battery may be enhanced even though the lithium metal oxide particles having the single particle shape are used.

In some embodiments, an average particle diameter ($D_{50}$) of the lithium metal oxide particles may be in a range from 1 μm to 20 μm. In some embodiments, the average particle diameter ($D_{50}$) of the lithium metal oxide particles may be in a range from 1.5 μm to 15 μm, from 2 μm to 10 μm, or from 2 μm to 7 μm. The average particle diameter ($D_{50}$) may be defined as a particle diameter at 50% of a volume cumulative particle diameter distribution, and may be measured using a laser diffraction method (microtrac MT 3000).

In some embodiments, a specific surface area of the lithium metal oxide particles may be in a range from 0.5 $\mu m^2/g$ to 0.9 $\mu m^2/g$, and In some embodiments, from 0.6 $\mu m^2/g$ to 0.85 $\mu m^2/g$. Within this range, the resistance properties of the lithium secondary battery may be further improved in combination with the dot-type conductive material.

In some embodiments, the lithium metal oxide particles may have a tap density from 2 $g/cm^3$ to 2.3 $g/cm^3$. Within this range, deterioration of the resistance and power properties of the lithium secondary battery may be prevented. The tap density may be measured using an auto tap analyzer (e.g., manufactures by Quantachrome).

In some embodiments, the lithium metal oxide particles may further contain a doping element. For example, the doping element may include Al, Ti, Ba, Zr, Si, B, Mg, P, Sr, W, La, etc.

In some embodiments, the cathode active material may further include a coating layer formed on at least a portion of a surface of the lithium metal oxide particle. For example, the coating layer may contain Al, Ti, Ba, Zr, Si, B, Mg, P, Sr, W, La, etc.

The binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

Figure 2:
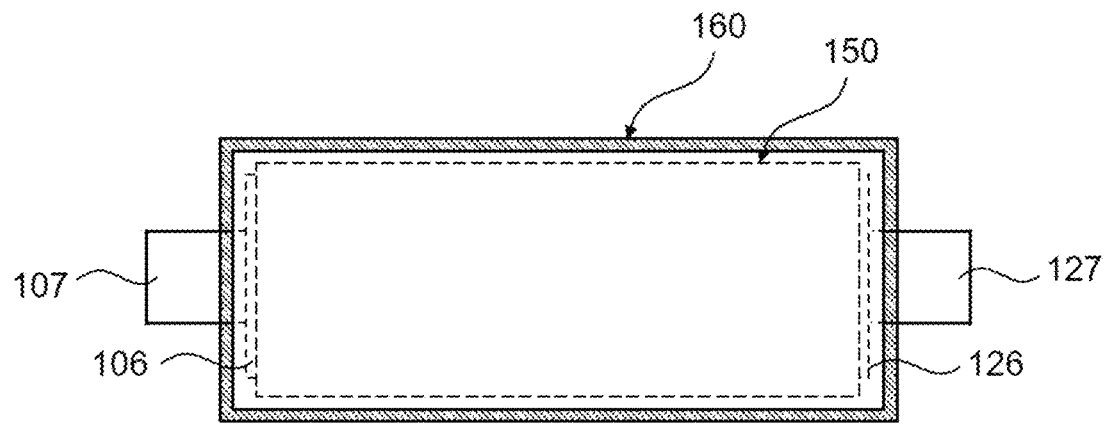
FIGS. 2 and 3 are a schematic plan projection view and a cross-sectional view, respectively, illustrating a lithium secondary battery in accordance with some embodiments.
Figure 3:
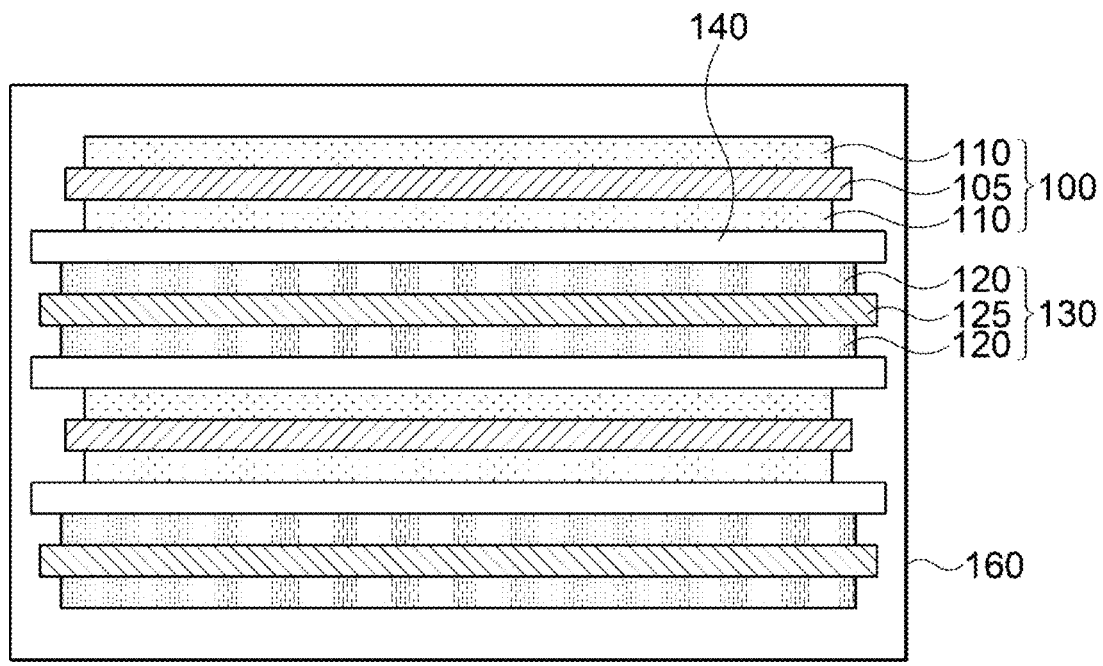

FIGS. 2 and 3 are a schematic plan projection view and a cross-sectional view, respectively, illustrating a lithium secondary battery in accordance with some embodiments.

Referring to FIGS. 2 and 3, a lithium secondary battery includes the above-described cathode 100 and an anode 130 facing the cathode 100.

The anode 130 may include an anode current collector 125 and an anode active material layer 120 formed on the anode current collector 125. For example, the anode active material layer 120 may be formed on one surface or both surfaces of the anode current collector 125.

The anode active material layer 120 may include an anode active material. The anode active material layer 120 may further include a binder, a conductive material, etc.

For example, the anode current collector 125 may include gold, stainless steel, nickel, aluminum, titanium, copper, or an alloy thereof.

The anode active material may be a material capable of adsorbing and desorbing lithium ions. The anode active material may include a lithium alloy, a carbon-based active material, a silicon-based active material, etc. These may be used alone or in a combination thereof.

For example, the lithium alloy may further include aluminum, zinc, bismuth, cadmium, antimony, silicon, lead, tin, gallium, indium, etc.

The carbon-based active material may include a crystalline carbon, an amorphous carbon, a carbon composite, a carbon fiber, etc.

The amorphous carbon may include, e.g., a hard carbon, cokes, a mesocarbon microbead (MCMB), a mesophase pitch-based carbon fiber (MPCF), etc.

The crystalline carbon may include, e.g., artificial graphite, natural graphite, graphitized coke, graphitized MCMB, graphitized MPCF, etc.

In some embodiments, the anode active material may include the silicon-based active material. The silicon-based active material may include, e.g., Si, $SiO_x$ (0<x<2), Si/C, SiO/C, Si-metal, etc. In this case, the lithium secondary battery having a high capacity may be implemented.

In some embodiments, an area of the anode 130 may be greater than that of the cathode 100. Accordingly, lithium ions generated from the cathode 100 may be easily transferred to the anode 130 without being precipitated.

The cathode 100 and the anode 130 may be alternately and repeatedly disposed to form an electrode assembly 150.

In some embodiments, a separation layer 140 may be interposed between the cathode 100 and the anode 130. For example, the electrode assembly 150 may be formed by winding, stacking or zigzag folding (z-folding) of the separation layer 140.

For example, the separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, etc. The separation layer 140 may also include a non-woven fabric formed from a glass fiber with a high melting point, a polyethylene terephthalate fiber, etc.

The lithium secondary battery according to some embodiments may include a cathode lead 107 connected to the cathode 100 to protrude to an outside of a case 160, and an anode lead 127 connected to the anode 130 to protrude to the outside of the case 160.

For example, the cathode lead 107 may be electrically connected to the cathode current collector 105. The anode lead 127 may be electrically connected to the anode current collector 125.

For example, the cathode current collector 105 may include a cathode tab 106 at one side thereof. The cathode active material layer 110 may not be formed on the cathode tab 106. The cathode tab 106 may be integral with the cathode current collector 105 or may be connected to the cathode current collector 105 by, e.g., welding. The cathode current collector 105 and the cathode lead 107 may be electrically connected via the cathode tab 106.

For example, the anode current collector 125 may include an anode tab 126 at one side thereof. The anode active material layer 120 may not be formed on the anode tab 126. The anode tab 126 may be integral with the anode current collector 125 or may be connected to the anode current collector 125 by, e.g., welding. The anode electrode current collector 125 and the anode lead 127 may be electrically connected via the anode tab 126.

The electrode assembly 150 may include a plurality of the cathodes and a plurality of the anodes. Each of the plurality of the cathodes may include the cathode tab. Each of the plurality of the anodes may include the anode tab.

The cathode tabs (or the anode tabs) may be laminated, pressed and welded to form a cathode tab stack (or an anode tab stack). The cathode tab stack may be electrically connected to the cathode lead 107. The anode tab stack may be electrically connected to the anode lead 127.

The lithium secondary battery may be fabricated into a cylindrical shape, a prismatic shape, a pouch shape, a coin shape, etc.

The electrode assembly 150 may be accommodated together with an electrolyte in the case 160 to form the lithium secondary battery. For example, the electrolyte may include a lithium salt and an organic solvent.

The lithium salt may be represented by $Li^+X^-$. For example, the anion $X^-$ may be any one selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

For example, the lithium salt may include $LiBF_4$, $LiPF_6$, etc.

The organic solvent may include a carbonate-based solvent, an ester-based solvent, an ether-based solvent, a ketone-based solvent, an alcohol-based solvent, an aprotic solvent, etc.

The carbonate-based solvent may include, e.g., dimethyl carbonate (DMC), ethyl methyl carbonate (EMC), diethyl carbonate (DEC), ethylene carbonate (EC), etc.

The ester-based solvent may include, e.g., methyl propionate, ethyl propionate, propyl acetate, butyl acetate, ethyl acetate, butyrolactone, caprolactone, valerolactone, etc.

The ether-based solvent may include, e.g., dibutyl ether, tetraethylene glycol dimethyl ether (TEGDME), diethylene glycol dimethyl ether (DEGDME), dimethoxyethane, tetrahydrofuran (THF), 2-methyltetrahydrofuran, etc.

The ketone-based solvent may include, e.g., cyclohexanone.

The alcohol-based solvent may include, e.g., ethyl alcohol, isopropyl alcohol, etc.

The aprotic solvent may include, e.g., a nitrile-based solvent, an amide-based solvent (e.g., dimethylformamide), a dioxolane-based solvent (e.g., 1,3-dioxolane), a sulfolane-based solvent, etc.

Hereinafter, embodiments are proposed to more concretely describe the present inventive concepts. However, the following examples are only given for illustrating the present inventive concepts and those skilled in the related art will obviously understand that various alterations and modifications are possible within the scope of the present disclosures.

Example 1

(1) Preparation of Lithium Metal Oxide Particles (Co Content: 0 Mol %)

A solution mixture was prepared by adding $NiSO_4$ and $MnSO_4$ to distilled water from which dissolved oxygen was removed at a molar ratio of 75:25.

In the solution mixture, NaOH and $NH_4OH$ were put into a reactor and co-precipitation was performed for 72 hours to prepare metal hydroxide particles represented as $Ni_{0.75}Mn_{0.25}(OH)_2$.

The metal hydroxide particles were dried at 100° C. for 12 hours, and re-dried at 120° C. for 12 hours.

The metal hydroxide particles and lithium hydroxide were input into a dry high-speed mixer so that the molar ratio was 1:1.03 to form a mixture.

The mixture was put into a calcination furnace, a temperature of the furnace was raised to 950° C. at 2° C./min, and the mixture was fired at 950° C. for 10 hours. During the firing, an oxygen gas was continuously passed through the furnace at a flow rate of 10 μmL/min.

After the firing, the fired product was naturally cooled to room temperature, and then pulverized and classified to obtain lithium metal oxide particles ($LiNi_{0.75}Mn_{0.25}O_2$).

(2) Fabrication of Cathode and Lithium Secondary Battery

The lithium metal oxide particles as a cathode active material, polyvinylidene fluoride (PVDF) as a binder and MWCNTs (length: 30 μm, specific surface area: 173 $m^2$/g, Raman $I_D/I_G$: 1.23) as a conductive material were dispersed in N-methyl-2-pyrrolidone (NMP) by a weight ratio of 94:3:3 to prepare a cathode slurry.

The cathode slurry was coated on an aluminum foil (thickness of 15 μm), and then dried and pressed to obtain a cathode. A lithium metal was used as a counter electrode (anode).

The cathode and the anode were each notched in a circular shape, and a circular polyethylene separator (thickness of 13 μm) was interposed between the cathode and the anode to prepare an electrode assembly.

The electrode assembly was placed in a coin-shaped casing and an electrolyte was injected to fabricate a coin-type lithium secondary battery. A 1M $LiPF_6$ dissolved in a mixed solvent of EC/EMC (30:70 v/v) was used as the electrolyte.

Example 2

(1) Preparation of Lithium Metal Oxide Particles (Co content: 1 mol %)

Metal hydroxide particles represented as $Ni_{0.75}Co_{0.01}Mn_{0.24}(OH)_2$ were prepared using similar procedure as in Example 1 except that cobalt sulfate ($CoSO_4$) was also added in the initial solution mixture.

Lithium hydroxide and the metal hydroxide particles were introduced into a dry high-speed mixer so that the molar ratio was 1:1.03 to prepare a mixture.

The mixture was put into a calcination furnace, a temperature of the furnace was raised to 950° C. at 2° C./min, and the mixture was fired at 950° C. for 10 hours. During the firing, an oxygen gas was continuously passed through the furnace at a flow rate of 10 μmL/min.

After the firing, the fired product was naturally cooled to room temperature, and then pulverized and classified to obtain lithium metal oxide particles ($LiNi_{0.75}Co_{0.01}Mn_{0.24}O_2$).

(2) Fabrication of Cathode and Lithium Secondary Battery

A lithium secondary battery was manufactured by the same method as that in Example 1, except that the above-prepared lithium metal oxide particles were used.

Examples 3 and 4

By varying the firing temperature, lithium metal oxide particles having different specific surface areas were prepared and used.

A conductive material in which carbon black ($D_{50}$: 30 nm, specific surface area: 254 μ$m_2$/g, sphericity>0.8, Raman $I_D/I_G$: 0.5) and the MWCNTs were mixed in a weight ratio of 1:1 was used.

Except for the above details, a lithium secondary battery was manufactured by the same method as that in Example 1.

Examples 5 and 6

A lithium secondary battery was manufactured by the same method as that in Example 1, except that MWCNTs having different lengths were used.

Example 7

A lithium secondary battery was manufactured by the same method as that in Example 1, except that a conductive material obtained by mixing carbon black ($D_{50}$: 30 nm, specific surface area: 254 μ$m^2$/g, sphericity>0.8, Raman $I_D/I_G$: 0.5) and the MWCNTs in a weight ratio of 1:1 was used.

Examples 8 and 9

A lithium secondary battery was manufactured by the same method as that in Example 7, except that carbon black having a different average particle diameter ($D_{50}$) was used.

Comparative Example 1

A lithium secondary battery was manufactured by the same method as that in Example 1, except that lithium metal oxide particles ($LiNi_{0.8}Co_{0.1}Mn_{0.1}O_2$) were used and MWCNTs having different Raman $I_D/I_G$ were used.

Comparative Examples 2 and 3

A lithium secondary battery was manufactured by the same method as that in Example 1, except that MWCNTs having different Raman $I_D/I_G$ were used.

Experimental Example (1) Morphological Measurement of Lithium Metal Oxide Particles The lithium metal oxide particles of Example 1 were randomly extracted and morphology of the particles was observed with a scanning electron microscope (SEM).

Referring to FIG. 4, the lithium metal oxide particles of Example 1 had a single particle shape.

(2) Measurement of Specific Surface Area of Lithium Metal Oxide Particles

Specific surface areas were measured by randomly extracting the lithium metal oxide particles of Examples and Comparative Examples.

The specific surface area was calculated according to a gas adsorption/desorption method using a BET measuring instrument (Micrometrics, ASAP2420).

(3) Measurement of Raman $I_D/I_G$

The cathodes for lithium secondary batteries of Examples and Comparative Examples were cut into a size of 1 cm×1 cm to prepare samples.

Surfaces of the samples on which the cathode active material layers were formed were analyzed by a laser Raman spectroscopy to obtain an Raman spectrum.

In the Raman spectroscopic analysis, a laser wavelength was set to about 532 nm, the number of scans was 20, and a laser exposure time was set to 10 seconds.

In the Raman spectrum, a maximum peak intensity $I_D$ in a D band (i.e., in a range of 1,300 cm$^{-1}$ to 1,400 cm$^{-1}$) and a maximum peak intensity $I_G$ in a G band (i.e., in a range of 1,550 cm$^{-1}$ to 1,650 cm$^{-1}$) were measured to calculate $I_D/I_G$.

(4) Evaluation on Internal Resistance (DCIR) Increase Ratio

The lithium secondary batteries of Examples and Comparative Examples were charged at 0.5 C CC/CV (4.2V 0.05 C CUT-OFF) at 25° C., and then discharged at 0.5 C CC to an SOC 60% state.

At the SOC 60% state, a DCIR R1 was measured by changing the C-rate to 0.2 C, 0.5 C, 1 C, 1.5 C, 2 C, 2.5 C and 3.0 C while discharging and complementary-charging for 10 seconds in each rate.

In the discharging and complementary-charging, an end point of a voltage was set as an equation of a straight line, and a slope was adopted as the DCIR.

The charged lithium secondary batteries of Examples and Comparative Examples were left at 60° C. for 3 weeks under atmospheric exposure conditions, further left at room temperature for 30 μminutes, and a DCIR R2 was measured by the same method as described above.

The internal resistance (DCIR) increase ratio was calculated as follows.

DCIR increase ratio (%)=(R2−R1)/R1×100(%)

(5) Evaluation on Life-Span Property (Capacity Retention)

The lithium secondary batteries of Examples and Comparative Examples were charged at 0.33 C CC/CV (4.2V 0.05 C CUT-OFF) and discharged at 0.5 C CC (2.7V CUT-OFF) at 25° C.

The charging and discharging were repeated 700 times, and a discharge capacity at the second cycle C2 and a discharge capacity at the 700th cycle C700 were measured.

The capacity retention was calculated as follows.

Capacity Retention (%)=C700/C2×100(%)

TABLE 1

| No. | composition of lithium metal oxide | specific surface area of lithium metal oxide | MWCNT length | carbon black ($D_{50}$) |
|---|---|---|---|---|
| Example 1 | $LiNi_{0.75}Mn_{0.25}O_2$ | 0.83 m$^2$/g | 30 μm | — |
| Example 2 | $LiNi_{0.75}Co_{0.01}Mn_{0.24}O_2$ | 0.87 m$^2$/g | 30 μm | — |
| Example 3 | $LiNi_{0.75}Mn_{0.25}O_2$ | 0.70 m$^2$/g | 30 μm | 30 nm |
| Example 4 | $LiNi_{0.75}Mn_{0.25}O_2$ | 0.9 m$^2$/g | 30 μm | 30 nm |
| Example 5 | $LiNi_{0.75}Mn_{0.25}O_2$ | 0.83 m$^2$/g | 8 μm | — |
| Example 6 | $LiNi_{0.75}Mn_{0.25}O_2$ | 0.83 m$^2$/g | 60 μm | — |
| Example 7 | $LiNi_{0.75}Mn_{0.25}O_2$ | 0.83 m$^2$/g | 30 μm | 30 nm |
| Example 8 | $LiNi_{0.75}Mn_{0.25}O_2$ | 0.83 m$^2$/g | 30 μm | 15 nm |
| Example 9 | $LiNi_{0.75}Mn_{0.25}O_2$ | 0.83 m$^2$/g | 30 μm | 60 nm |
| Comparative Example 1 | $LiNi_{0.8}Co_{0.1}Mn_{0.1}O_2$ | 0.87 m$^2$/g | 30 μm | — |
| Comparative Example 2 | $LiNi_{0.75}Mn_{0.25}O_2$ | 0.83 m$^2$/g | 30 μm | — |
| Comparative Example 3 | $LiNi_{0.75}Mn_{0.25}O_2$ | 0.83 m$^2$/g | 30 μm | — |

TABLE 2

| No. | $I_D/I_G$ of cathode active material layer | DCIR increase ratio (%) | capacity retention (%) |
|---|---|---|---|
| Example 1 | 1.1 | 20 | 90 |
| Example 2 | 1.1 | 20 | 90 |
| Example 3 | 1.1 | 15 | 91 |
| Example 4 | 1.1 | 40 | 88 |
| Example 5 | 1.24 | 50 | 82 |
| Example 6 | 0.6 | 45 | 84 |
| Example 7 | 1.0 | 15 | 92 |
| Example 8 | 0.9 | 45 | 84 |
| Example 9 | 0.5 | 48 | 82 |
| Comparative Example 1 | 1.28 | 20 | 90 |
| Comparative Example 2 | 0.4 | 50 | 81 |
| Comparative Example 3 | 1.3 | 55 | 80 |

If a lithium metal oxide having a low cobalt content (e.g., a cobalt content of 2 mol % or less based on all elements except lithium and oxygen) or a lithium metal oxide that does not contain cobalt is used, resistance and life-span properties of the lithium secondary battery may be deteriorated.

Referring to Examples 1 and 2, and Comparative Examples 1 to 3, the $I_D/I_G$ value of the cathode within a predetermined numerical range (e.g., from 0.5 to 1.25) were adjusted, deterioration of the resistance and life-span properties of the lithium secondary battery was prevented even when the lithium metal oxide having a low cobalt content or devoid of cobalt was used.

Referring to Examples 3 and 7 and Comparative Example 1, the $I_D/I_G$ value of the cathode was adjusted to a predetermined range and a mixture of the linear-type conductive material and the dot-type conductive material was used, the resistance and life-span properties of the lithium secondary battery were improved even when the lithium metal oxide devoid of cobalt was used.

What is claimed is:
1. A cathode for a lithium secondary battery, comprising:
a cathode current collector; and
a cathode active material layer formed on the cathode current collector, the cathode active material layer comprising a cathode active material and a conductive material, the cathode active material layer satisfying Formula 1, and wherein the cathode active material comprises lithium metal oxide particles containing nickel and manganese and having a content of cobalt of less than 2 mol % among all elements except for lithium and oxygen, $$0.5 \leq I_D/I_G \leq 1.25 \quad \text{Formula 1}$$

wherein, in formula 1, $I_D$ is a maximum peak intensity in a range of 1,300 cm$^{-1}$ to 1,400 cm$^{-1}$ in a Raman spectrum of the cathode active material layer, and $I_G$ is a maximum peak intensity in a range of 1,550 cm$^{-1}$ to 1,650 cm$^{-1}$ in the Raman spectrum of the cathode active material layer, wherein the conductive material comprises a linear-type conductive material having a length in a range from 10 μm to 55 μm.

2. The cathode for a lithium secondary battery according to claim 1, wherein the lithium metal oxide particles do not contain cobalt.

3. The cathode for a lithium secondary battery according to claim 1, wherein a content of nickel in the lithium metal oxide particles is in a range from 70 mol % to 85 mol % among all elements except lithium and oxygen.

4. The cathode for a lithium secondary battery according to claim 1, wherein the lithium metal oxide particles have a single particle shape.

5. The cathode for a lithium secondary battery according to claim 1, wherein the lithium metal oxide particles have an average particle diameter ($D_{50}$) from 2 μm to 7 μm.

6. The cathode for a lithium secondary battery according to claim 1, wherein the lithium metal oxide particles have a specific surface area from 0.6 m$^2$/g to 0.85 m$^2$/g.

7. The cathode for a lithium secondary battery according to claim 1, wherein the lithium metal oxide particles have a tap density from 2 g/cm$^3$ to 2.3 g/cm$^3$.

8. The cathode for a lithium secondary battery according to claim 1, wherein the conductive material further comprises a dot-type conductive material.

9. The cathode for a lithium secondary battery according to claim 8, wherein the linear-type conductive material comprises carbon nanotube, and the dot-type conductive material comprises at least one selected from the group consisting of graphite, carbon black, graphene, tin, tin oxide, titanium oxide, LaSrCoO$_3$ and LaSrMnO$_3$.

10. The cathode for a lithium secondary battery according to claim 8, wherein the dot-type conductive material has an average particle diameter ($D_{50}$) from 20 nm to 50 nm.

11. A lithium secondary battery, comprising:
the cathode for a lithium secondary battery of claim 1; and
an anode facing the cathode.

12. The lithium secondary battery according to claim 11, further comprising a separator disposed between the anode and the cathode, and an electrolyte in which the separator is immersed.

* * * * *